United States Patent Office 3,002,497
Patented Oct. 3, 1961

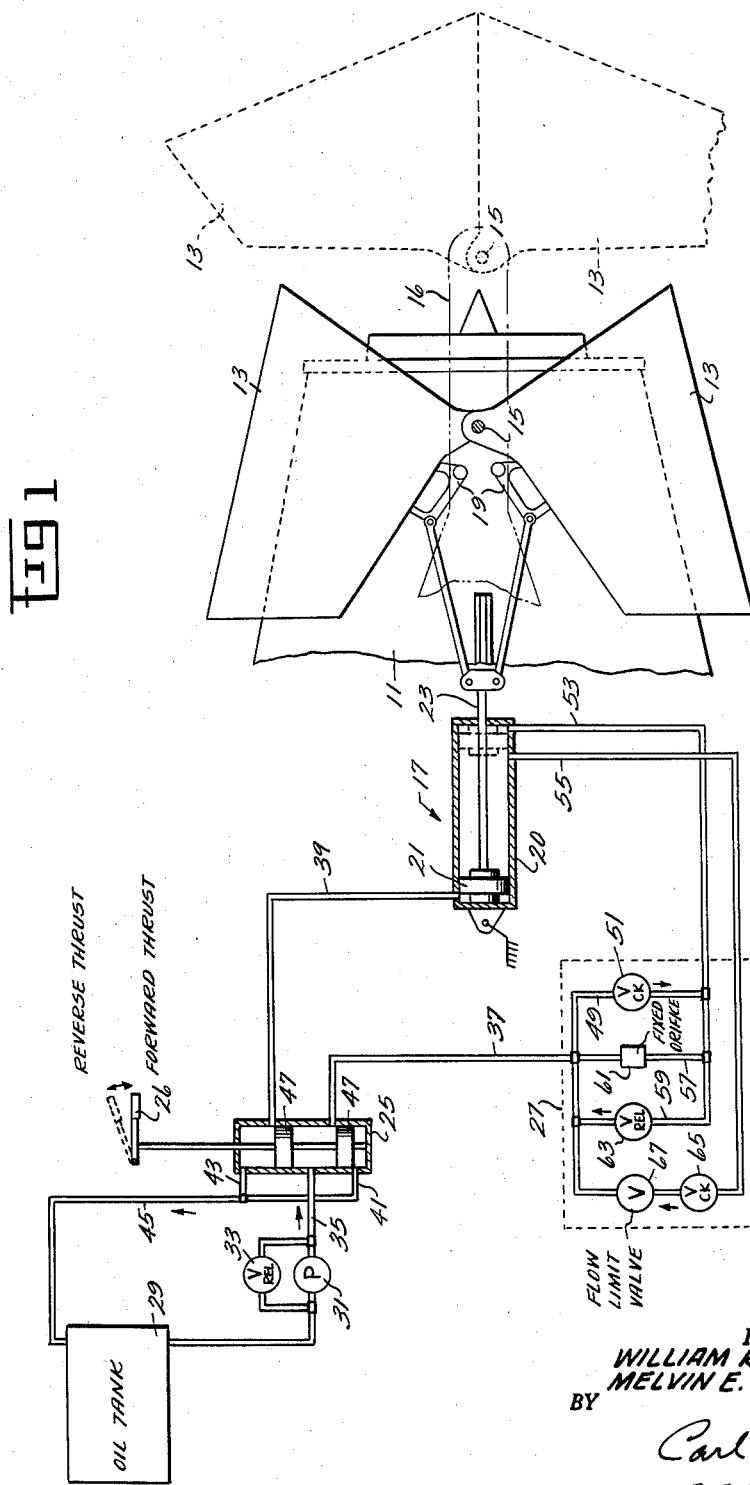

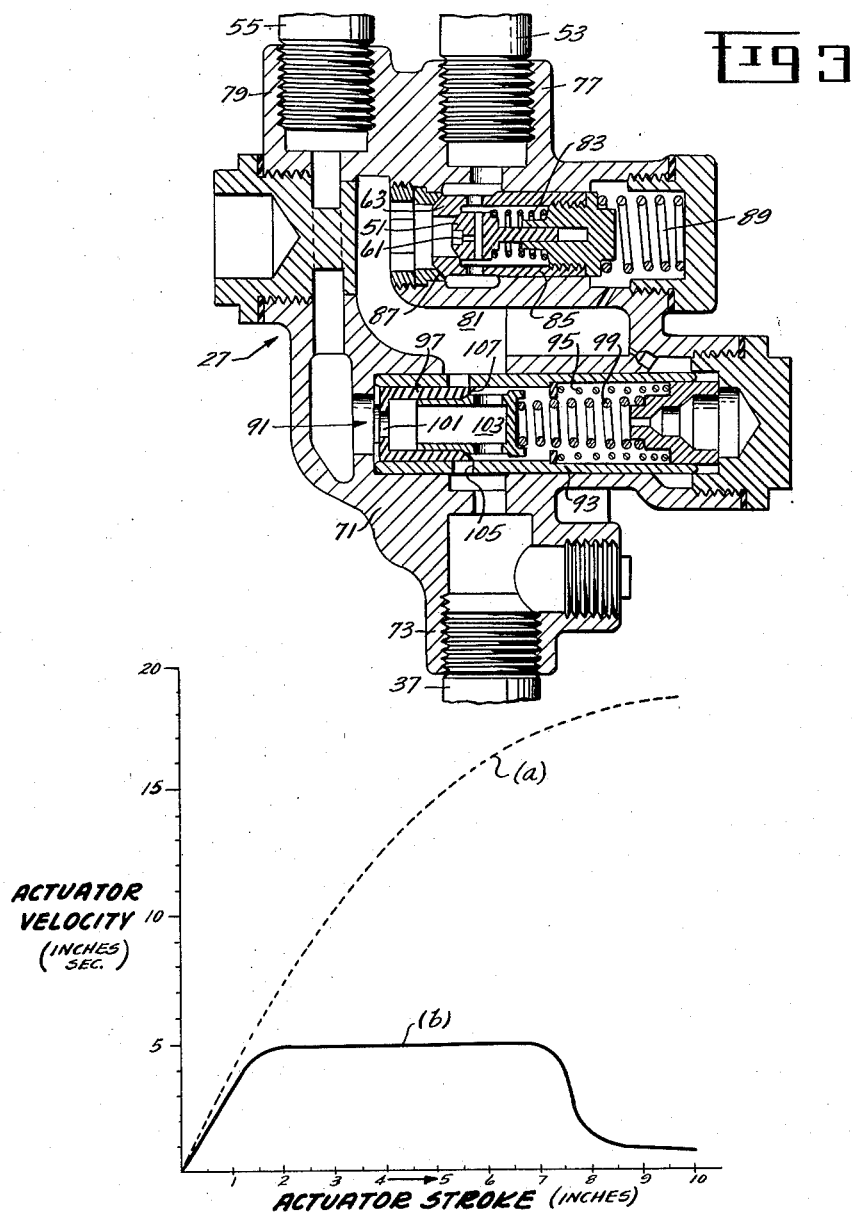

3,002,497
VELOCITY LIMITED FLUID ACTUATOR WITH PRESSURE RESET
William K. Gulick, Glendale, and Melvin E. Criffield, Cincinnati, Ohio, assignors to General Electric Company, a corporation of New York
Filed Apr. 18, 1960, Ser. No. 22,956
1 Claim. (Cl. 121—38)

This invention relates generally to fluid powered actuator systems and more specifically to such systems wherein actuators of expansible chamber motor type are provided with fluid supply and control mechanism incorporating means operative to limit maximum rates of travel of the actuator and also operative to reset system pressure levels when the actuator reaches an end of its travel.

In many fluid power actuator applications it is desirable for one reason or another to limit the maximum velocity at which the actuator and its attached load are permitted to travel, particularly as the actuator approaches an end of its working stroke and accordingly is about to run into a stop or other motion limit device. Velocity control also is frequently required where the load driven by the actuator is subjected to high external forces loading it in one direction of actuator travel; in this situation the actuator and load are very likely to overspeed when moving in the direction of and accelerated by the applied external force unless some limitation is placed on the allowable rate of travel. If actuator and load velocities are permitted to become excessive, then of course there is risk of substantial damage to the apparatus when the limit stops are reached.

One example of an installation in which this problem is severe is to be found in the actuation of thrust reversers for aircraft turbojet engines. Since to be effective the propulsive jet deflection members of the thrust reverser must necessarily be so disposed as to intercept and deflect the engine exhaust gas stream, the reverser structure is heavily loaded aerodynamically and unless this aerodynamic loading is precisely balanced under all operating conditions there results a very substantial net force loading on the thrust reverser parts tending to accelerate their movement toward one or the other of their operative positions, i.e., either forward thrust or reverse thrust position.

Thus, where fluid actuators are employed to drive a load of this type and are connected to a pressure fluid supply of capacity sufficient to afford reasonably fast action in the direction of movement opposed by the applied external force loading, then unless restraints are imposed the actuator and load are quite likely to overspeed in the reverse direction, i.e., in the direction in which the external force loading assists the actuators. In the case of thrust reversers, for example, such overspeed could cause the thrust reverser parts to slam into their stops or into each other at velocities sufficient to cause substantial structural damage.

In applications of this type it accordingly is desirable and sometimes essential to incorporate means for limiting actuator travel rates particularly adjacent the end of the actuator working stroke. Ideally, the velocity limit means should schedule the maximum limits on actuator travel rates at values varying as a function of actuator position, in a manner to permit relatively high velocity through the mid-portion of the working stroke and to sharply decelerate the actuator adjacent the end of its stroke just prior to running into its stop or other motion limit.

Many approaches to the actuator velocity limit problem have heretofore been proposed and certain of these have come into wide use in various applications. Among the several possible approaches to the problem are those involving the interposition of some sort of fluid flow restriction device either in the fluid supply line to the actuator or in the exhaust line therefrom, to thus impose restraints on the rates of flow of operating fluid to or from the actuator.

The present invention relates to fluid actuator and control systems of this general type, and has as its principal objective the provision of new and improved such systems presenting significant advantages particularly in applications wherein the actuator and attached load are subjected to applied external forces tending to drive the actuator in one or both directions of travel.

In applications such as the thrust reverser installation just described, wherein the actuator and load are strongly biased toward one position by the external force loading, the actuator serves primarily to limit the rate of travel toward that position and once it is reached the actuator force loading then is no longer needed in order to hold the load in the terminal position, the applied external force being adequate for this purpose. In such cases the continued supply of pressure fluid to the actuator at high fluid pressure levels serves no useful purpose; the high fluid pressure levels reflected back to the pressure fluid supply source may cause unnecessary wear of the various elements comprising this source, and there may also be undesirable heating of the operating fluid. In accordance with the invention, actuator systems for use in applications of this type may include means, coacting with the actuator velocity limit means, for resetting fluid pressure levels in the system to lower values when the actuator reaches an end of its travel.

It is accordingly another object of the invention to provide, in actuator systems for use in applications wherein the actuator and attached load are subjected to high external force loading tending to hold them in one terminal position, means for resetting pressure levels in the operating fluid supply to the actuator to lower values when this terminal position is reached.

In carrying out the invention in one preferred embodiment, there is provided a fluid actuator of expansible chamber motor type having pressure fluid supply and discharge ports adjacent the ends of the expansible chamber, and at least one additional discharge port positioned in the path of movement of the expansible chamber movable wall means so as to be closed thereby at a point in the travel thereof intermediate the extremes of actuator movement. This intermediate port and the adjacent actuator end port are each connected to drain through flow restraining devices which provide separate flow paths to drain and which may have either similar or different flow characteristics. When the actuator movable element is being driven toward the end of the actuator into which these flow limited ports are open, its rate of travel initially is limited in accordance with the combined flow characteristics of both of the two flow restraining devices. As the actuator movable element passes over and blocks the intermediate port the actuator then can exhaust through only one of the two flow restraining devices, hence its rate of travel is reduced accordingly to a new and lower value determined by the flow characteristics of the one flow restraining device still operative. The intermediate port is arranged so as to again be opened by the movable wall member after it has passed this port and reached its limit stop, at which point pressure levels in the system will be reset to lower values by flow through the flow restraining device through which the intermediate port connects to drain.

The invention will be further understood and its various objects, features and advantages more fully appreciated by reference to the appended claim and the following detailed description when read in conjunction with the accompanying drawings, wherein:

FIGURE 1 is a schematic diagram of a fluid actuator and control system embodying the invention and shown connected to actuate an aircraft turbojet engine thrust reverser;

FIGURE 2 is a curve of actuator velocity vs. actuator position, with the solid line curve illustrating the velocity-position relationship in the system of FIGURE 1 and the dotted line curve showing this relationship in a conventional system omitting the velocity limit mechanism of FIGURE 1; and FIGURE 3 is a sectional view through a combination flow metering valve particularly adapted to use in the system of FIGURE 1.

With continued reference to the drawings, wherein like reference numerals have been used throughout to designate like elements, FIGURE 1 illustrates the invention as incorporated in an actuating system for an aircraft jet engine thrust reverser. It is to be understood, of course, that the invention is not limited to use in such systems, but has utility in many applications wherein actuator velocity limiting is necessary or desirable either by reason of applied external forces or for other reasons.

In FIGURE 1, an aircraft turbojet engine, only the propulsion nozzle end of which is illustrated, is designated generally by reference number 11. The nozzle 11 has associated therewith a thrust reverser assembly comprising a pair of blocker doors 13 pivotable on trunnions 15 slidable in a track structure 16 fixed to the basic engine structure. These blocker doors 13, shown in solid lines in their forward thrust position, translate in rearwardly direction and simultaneously pivot on trunnions 15 to the position shown in dotted lines, in which position they intercept the jet exhaust stream and deflect it laterally and forwardly to provide reverse thrust. Thus, in the reverse thrust position as shown in dotted lines, the blocker doors prevent direct rearward discharge of the propulsive jet stream, and instead deflect it forwardly to provide reverse thrust for aircraft braking purposes as during the aircraft landing roll. The construction and operation of this thrust reveser assembly is fully described in the copending application of Dudley O. Nash, S.N. 860,590, filed December 18, 1959 and assigned to the assignee of the instant application.

The blocker doors 13 are shifted between the forward thrust position shown in full lines and the reverse thrust position shown in dotted lines by a pair of hydraulic actuators 17 only one of which is shown since the two are identical in construction and are connected in parallel. The actuator 17 is of piston and cylinder type with the cylinder member 20 fixed to the engine structure and with the actuator piston 21 coupled by piston rod 23 to mechanical linkage mechanism 19 of the construction disclosed in the aforementioned Nash application. This linkage converts the translatory motion of the actuator into the combined rotary and translatory motion required of the blocker doors. The hydraulic actuator 17 operates under control of a pilot valve 25 linked to a manual control lever 26 manipulated by the aircraft pilot either directly or by connection to the engine throttle lever.

Before considering further the details of this hydraulic actuator and control system, it is to be noted that the configuration of the blocker doors 13 is such that as they translate and rotate toward reverse thrust position, and move to intercept the engine exhaust stream, the projection of the blocker door edges into the aircraft slipstream imposes aerodynamic loading on the blocker doors tending to move them further toward reverse thrust positon. This loading is later augmented by forces generated by deflection of the exhaust gas stream by the blocker doors, increasingly as the blocker doors approach their full reverse thrust position. In this manner, the blocker doors, once they have left the forward thrust or "stowed position" and start to move toward reverse thrust position, are subjected to strong aerodynamic loading toward the latter position.

Accordingly, unless the rate of blocker door movement toward reverse thrust position is limited in some fashion, the applied aerodynamic loading could cause the blocker doors to reach such high velocities that when the doors slammed together in reverse thrust position substantial damage might be done to the door structures. In accordance with the invention, this necessary control of blocker door velocity is afforded by the actuator 17 and associated control system as hereinafter explained. The actuator 17 thus must serve a dual purpose in that it must first provide the necessary actuating force to initiate and assure continued movement of the blocker doors from either terminal positon to the other, and it must also limit the maximum rate of travel of the blocker doors when subjected to aerodynamic loading tending to accelerate them toward reverse thrust position.

The blocker doors when in reverse thrust position are subjected to aerodynamic loading adequate to hold the doors in that position, hence it is not necessary that actuator 17 continue to exert a force against the blocker doors in order to hold their position, as the actuator would do if conventionally controlled. Also, when the actuator and blocker doors reach this terminal position, hydraulic pressure levels in the actuator supply system would be limited only by any maximum pressure relief device included within the system and accordingly would become quite high. Since maintenance of such high pressure levels serves no useful purpose under these conditions and may cause unnecessary wear of system components such as the supply pump, the control system of the invention may provide means for resetting fluid pressures in the system to lower values once the blocker doors have reached thrust reverse position and are held in such position by aerodynamic loading.

The actuator supply and control system by which these objectives are attained in accordance with the invention includes a hydraulic fluid supply tank 29 having a supply line connection to the inlet of a positive displacement pump 31 providing pressure fluid to the actuator and control system. Pump 31 preferably is bypassed by a pressure relief valve 33 operative to limit maximum pressure downstream of the pump, by bypassing back to the pump inlet.

The pilot valve 25, which as previously noted may be manually controlled by the aircraft pilot, operates to duct high pressure fluid from the pump discharge line 35 to either of two supply lines 37 or 39 leading to the rod end and head end, respectively, of the actuator cylinder 20. At the same time, the pilot valve connects the other of these two actuator supply lines to one of two drain connections at 41 and 43, both of which are connected by a line 45 back to the supply tank. Thus, when the pilot valve occupies the position shown, its two spool elements 47 are so disposed as to connect the high pressure line 35 to supply line 37, and to connect the other supply line 39 to drain through lines 43 and 45. Line 39 connects directly into the head end of the actuator cylinder 20; line 37 connects into the rod end of the actuator cylinder through actuator velocity limit mechanism designated generally by reference numeral 27.

In the particular embodiment illustrated, this velocity limit mechanism is so constructed as to be effective only when the actuator is moving toward reverse thrust position; no such limiting action is necessary when moving toward forward thrust position since actuator velocities in this direction will adequately be limited by the aerodynamic loading against which the actuator must work. To render the velocity limit not operative when the actuator is to move in forward thrust direction, the limit mechanism includes a first branch passage 49 having interposed therein a check valve 51 which may be of conventional construction. This valve bypasses the other components of the velocity limit mechanism 27 and permits free flow of hydraulic fluid to actuator 17 when actuator movement in forward thrust direction is called for.

Thus, when movement in this direction is indicated, hydraulic fluid is ported by pilot valve 25 through line 37, then through line 49 and the check valve 51 included therein, and through line 53 to the rod end of the actuator. As the actuator piston moves toward forward thrust piston, i.e., moves toward the left in FIGURE 1, hydraulic fluid in the head end of the actuator may freely escape through lines 39, 43 and 45 to drain.

When pilot valve 25 is shifted upwardly to reverse thrust position, the high pressure supply line 35 then will be connected through line 39 to the head end of actuator 17, and fluid entrapped in the rod end of the actuator cylinder must escape either through line 53 or line 55 both of which connect into the velocity limit mechanism 27, and from there through lines 37, 41 and 45 to drain.

It will be noted that line 55 connects into the actuator cylinder 20 at a point intermediate the ends thereof, hence as the actuator piston 21 moves toward reverse thrust position, i.e., toward the right in FIGURE 1, it passes over and blocks the port through which this line connects into the cylinder. At the start of the actuator stroke, however, line 55 is open to the rod end of the actuator cylinder so fluid may escape therefrom through either or both of lines 53 and 55.

Fluid flow through line 53 to the velocity limit device 27 finds the branch passage 49 therein blocked by check valve 51, hence any flow from line 53 must pass through either of two other branch lines 57 and 59. Line 57 has interposed therein a fixed orifice element 61 operative to permit only limited fluid flow through this line. Branch line 59 contains a pressure relief valve 63 which normally remains closed but which may open to limit maximum pressure levels at the rod end of the actuator, for a purpose which will later be explained.

Line 55 has interposed in series therein two valves 65 and 67, the valve 65 being a check valve which may be of conventional construction. The valve 67 is a flow limit valve which may likewise be of conventional construction, but preferably is of the construction illustrated in FIGURE 3. Regardless of whether the construction of FIGURE 3 or a commercially available valve is used, however, it should be of construction such as to permit substantially free flow up to the design maximum flow rate, then to meter the flow so as to hold to this design flow rate irrespective of fluid pressure level. The flow rate held is preferably but not necessarily substantially higher than the flow rate through orifice 61 at the pressure levels normally encountered in the system.

As the actuator piston moves toward reverse thrust position, i.e., to the right in FIGURE 1, due to the combined effects of pressure fluid supply to the head end of the actuator and aerodynamic force loading on the blocker doors, hydraulic fluid will escape from the rod end of the actuator through both lines 53 and 55. Flow rate through the line 53 will be held to relatively low value because of the relatively small size of fixed orifice 61 and the normal absence of pressure levels adequate to open the pressure relief valve 63. Most of the fluid flow accordingly will be through line 55, past check valve 65, through the flow limit valve 67 and through line 37 to drain. The flow limit valve will initially permit substantially free flow and thus will permit fast acceleration of the actuator piston 21 up to a velocity such that the piston displaces fluid at the design maximum flow rate of the flow limit valve, at which point the valve becomes operative to prevent further increase in flow rate. When this point is reached, the flow limit valve will permit escape of fluid from the actuator rod end at fixed flow rate and will limit the rate of travel of the actuator piston accordingly, regardless of the magnitude of applied aerodynamic forces on the blocker doors.

When the actuator piston 21 reaches the port through which line 55 connects into the actuator cylinder 20, flow through line 55 then is blocked by the piston and fluid entrapped in the actuator rod end can escape only through line 53. As previously noted, the flow rate permitted by the fixed orifice 61 through which line 53 connects to drain is substantially lower than the flow rate fixed by flow limit valve 67. Accordingly, the total flow rate is now substantially reduced and the rate of travel of the actuator piston is similarly reduced, to a value dependent on the size of fixed orifice 61 and the pressure difference across this orifice. The net effect of this reduction in flow rate is to decelerate the actuator piston just prior to its reaching the end of its stroke, thus minimizing impact on the blocker doors as they come together in thrust reverse position.

The pressure relief valve 63 is usually not essential to operation of the system; its purpose is simply to relieve any high pressure transients due to "water hammer" or like effects which may be attendant upon operation of the actuator in particular applications. The check valve 65 connected in line 55 serves to prevent flow of pressure fluid from line 37 through line 55 and into the actuator cylinder during transition from reverse thrust to forward thrust positions. This is desirable if, as in the construction shown, the port through which line 55 connects into actuator cylinder 20 is so disposed as to be open into the cylinder when the actuator piston occupies its full reverse thrust position as shown in dotted lines. The supply of pressure fluid through line 37 during transition to forward thrust setting could, in the absence of check valve 65, pass through line 55 to the head end side of the actuator piston, thus bypassing the desired connection of pressure fluid to the actuator rod end through line 37, line 49, check valve 51 and line 53.

The illustrated arrangement wherein this port to line 55 remains open presents an important advantage in that it affords direct communication between lines 39 and 55, through the actuator cylinder 20, when piston 21 is in reverse thrust position, i.e., to the right in FIGURE 1. The resultant flow of pressure fluid from line 39 through line 55, valves 65 and 67, and line 37 to drain, effects a significant reduction in pressure levels in the entire system and thus reduces the pressure level against which pump 31 must operate, with consequent improvement in service life of the pump and other system elements. This reset in pressure level effects a reduction in the force applied by actuator 17 to the blocker doors, of course, but in applications wherein these doors are aerodynamically loaded toward thrust reverse position, continued application of high actuator force levels to the blocker doors when in thrust reverse position would serve no useful purpose anyway.

With reference now to FIGURE 2, the operation of the velocity limit mechanism just described is illustrated graphically. In FIGURE 2, the dotted line curve (a) represents typical behavior of a conventional actuator system when subjected to high external force loading. As shown, the actuator velocity increases quite rapidly to very high values, limited only by the capacity and inherent flow resistance of the hydraulic fluid supply and piping. At the end of the actuator stroke, actuator velocity has reached a value such that when the actuator and attached load run into their stop there may be structural damage in the case of such installations as engine thrust reversers.

The solid line (b) in FIGURE 2 indicates the actuator velocity vs. stroke relationship in one velocity limited actuator system in accordance with the invention. During the initial part of the actuator stroke, say for the first two inches of the stroke, actuator velocity increases rapidly because the flow limit valve permits substantially free flow until the design maximum value of flow is reached. At this point, the actuator velocity curve flattens out and remains substantially flat through the major part of the actuator stroke.

When the actuator nears the end of its stroke, at approximately the 8-inch position in the example illustrated, flow through the flow limit valve is cut off and all flow must now pass through the relatively small fixed orifice 61. This reduction in flow rate causes the actuator velocity to decrease sharply, as indicated by the drop in curve (b), as the actuator approaches the end of its travel. In this fashion, the actuator is permitted to attain and hold reasonably high velocity over the major portion of its working stroke, and just before the end of the stroke is reached the actuator velocity is substantially reduced so as to provide a cushioning effect to bring the actuator smoothly into its terminal position.

FIGURE 3 illustrates in structural detail a preferred embodiment of the velocity limit mechanism 27 of FIGURE 1, with its several elements integrated to form a unitary combination flow metering valve assembly. This assembly, designated generally by reference numeral 27, comprises a housing 71 having a plurality of inlet fittings 73, 77 and 79 into each of which is connected one of the pressure fluid lines 37, 53 and 55, respectively. Within housing 71 the inlet fitting 73 connects directly into a central chamber 81, and fluid flow between this chamber 81 and the other two inlet fittings 77 and 79 is controlled by a number of differently functioning flow control elements each corresponding to one of the elements 51, 61, 63, 65 and 67 in FIGURE 1.

These elements are correspondingly numbered in FIGURE 3. Thus, the check valve 51 is shown in FIGURE 3 as controlling fluid flow between lines 37 and 53, by control of communication between chamber 81 and fitting 77. This check valve 51 comprises a movable valve element lightly loaded as by a spring 83 in valve closing direction. Whenever fluid pressure in line 37 and in the chamber 81 connected thereto exceeds that in line 53, the check valve 51 will move to the right against the action of spring 83 to provide communication between lines 37 and 53.

The fixed orifice 61 which controls actuator fluid flow rate through the terminal portion of the actuator working stroke may conveniently be formed as a small port which opens through the head of the check valve element 51, as shown. This fixed orifice 61 permits limited flow of fluid from line 53 to line 37 for actuator velocity limiting as previously explained.

The pressure relief valve 63, if such valve is to be included in the system, may conveniently be made coaxial with the check valve 51 in the form of a surrounding sleeve element 85 having valve surfaces mating with a valve seat 87 fixed in housing 71 and with the check valve 51 as shown. The pressure relief valve assembly 63 is loaded toward closed position by a relatively strong spring 89 urging it to the left in FIGURE 3. In event the pressure level in line 53 becomes excessive, due to "water hammer" or like effects of actuator operation, the valve assembly 63 will move to the right against the action of spring 89, to vent line 53 to the chamber 81 and from that chamber through line 37 to drain.

Lines 37 and 55 interconnect through a combined check valve and flow limit valve assembly designated generally by reference numeral 91, which corresponds in purpose and operation to the two valves 65 and 67 of FIGURE 1. As shown in FIGURE 3, this combined valve assembly comprises a first sleeve element 93 slidable in housing 71 and normally urged to the left in FIGURE 3 by a relatively light spring 95. A second sleeve element 97 concentrically disposed within the first and slidable therein, is likewise urged to the left in FIGURE 3 as by a loading spring 99. An orifice 101 formed in the end wall of this second sleeve element 97 permits fluid flow between line 55 into a chamber 103 formed centrally within the sleeve elements. Flow outwardly from this chamber 103 to chamber 81 and line 37 is controlled by metering valve means constituted by ports 105 in sleeve element 93 and the co-operating edge 107 of the sleeve member 97 which controls the open area of these ports 105.

Considering first the check valve function of the assembly 91, this function serves to prevent any flow from line 37 to line 55 regardless of relative pressure levels in the two lines. This result obtains by virtue of the fact that when the pressure level in line 37 exceeds that in line 55 the valve elements 93 and 97 then are shifted by springs 95 and 99 into the position illustrated in FIGURE 3, in which position the ports 105 are completely closed by the coacting edge 107 of valve element 97. There accordingly can be no flow from line 37 into chamber 103 within the valve assembly, and fluid flow from line 37 to line 55 is thus closed off.

When the pressure relationships are reversed and become such as to induce flow from line 55 to line 37, i.e., when the pressure in line 55 exceeds that in line 37, this applied pressure difference operating against the outer sleeve element 93 will cause that element to move quickly to the right, against the action of its relatively weak loading spring 95. The spring 99 which loads the inner sleeve element 97 initially will hold that element in substantially the position shown, so that after this initial movement the ports 105 will now be full open to permit fluid flow from line 55 through orifice 101 into chamber 103 and from there through ports 105 to line 37.

As the rate of fluid flow through the orifice 101 increases, the pressure drop across this orifice will likewise increase and when the flow rate reaches a predetermined limit value the pressure drop across the orifice, being applied to valve element 97, will cause that element to move to the right to thus effect a reduction in open area of the ports 105 and a resultant limitation of fluid flow rate. In this manner, flow rate through the valve assembly 91 is limited closely to this design maximum flow rate, with movement of valve element 97 and consequent variation of the open area of ports 105 as necessary to maintain the desired limit flow rate.

The combination flow metering valve of FIGURE 3 when incorporated in the thrust reverser system of FIGURE 1 operates in substantially the same manner as previously explained with reference to the separate valve elements shown in FIGURE 1. Thus, when the manual control lever 26 is in forward thrust position, line 37 is pressurized and this pressure is communicated to chamber 81 in the combination valve of FIGURE 3. The fluid pressure in chamber 81 causes check valve 51 to open, permitting free flow of pressure fluid to line 53 and through that line to the rod end of actuator 17 to drive the actuator to forward thrust position.

When the manual control lever 26 is shifted to reverse thrust position, pilot valve 25 ports pressure fluid through line 39 to the actuator and connects line 37 to drain. As the actuator piston moves toward reverse thrust position, its movement pressurizes the fluid in lines 53 and 55. Since valves 51 and 63 are both now in closed position only very limited flow through line 53 to drain is permitted, this flow being controlled by fixed orifice 61.

The pressure in line 55 acting on valve assembly 91 will cause the outer sleeve element 93 to shift quickly to the right, to thus connect valve chamber 103 to line 37 and permit fluid flow from line 55 through orifice 101 into chamber 103 and from there to line 37. As the flow rate through orifice 101 increases, the pressure drop across the orifice will build up and eventually reach a level such as to cause the inner sleeve element 97 to move to the right and to restrict the open area of ports 105, thus preventing further increase in fluid flow rate and limiting actuator velocity accordingly.

Once the actuator piston passes over and blocks the port through which line 55 opens into the actuator cylinder, fluid then can escape from the cylinder only through line 53 and fixed orifice 61. This acts generally as a brake and slows the actuator down immediately. Pressure relief valve 63, which is in parallel with orifice 61, "gives" as necessary to absorb any pressure shocks and prevent "water hammer" effects.

It will be apparent to those skilled in the art that the actuator cylinder could, if desired, be provided with a plurality of intermediate ports each connecting to drain through either a flow limit valve or through a fixed orifice, to obtain any desired schedule of maximum actuator velocity vs. actuator position. Similarly, for certain applications it may be preferred to make all of the flow restraining devices of like character, i.e., either of fixed orifice or of flow limit type, and in other applications of systems incorporating flow restraining devices of different characteristics to reverse their respective positions if necessary to obtain the desired actuator velocity vs. position schedule.

Certain preferred embodiments of the invention have been described and illustrated by way of example in the foregoing, but many modifications will occur to those skilled in the art and it therefore should be understood that the appended claim is intended to cover all such modifications as fall within the true spirit and scope of the invention.

What is claimed as new and desired to be secured by Letters Patent of the United States is:

In a fluid actuator system for positioning a load subjected to high external force tending to drive the actuator and load in at least one direction of their travel and to retain them in position at one extreme of travel; a fluid pressure energized expansible chamber motor including first wall means defining a working fluid chamber, first and second fluid flow ports opening through said wall means into said chamber at opposite sides thereof for supply of pressure fluid thereto and drain therefrom, second wall means movable relative to said first wall means and disposed in said chamber for travel between said ports in response to fluid pressures applied therethrough, a third fluid flow port opening into said chamber through said first wall means at such point in the path of travel of said second wall means as to be blocked thereby through at least a portion of said wall means travel and to be open into said chamber when said second wall means is at either extreme of its travel; and pressure fluid supply and control means for energizing said motor and limiting its rate of travel at least in the direction aided by said external force comprising first, second and third flow lines connecting respectively into said first, second and third ports, pressure fluid drain and supply means, control valve means selectively operable to connect said first fluid flow line to said supply means and said second and third lines to drain or to connect said first line to drain and said second and third lines to said supply means, and first and second fluid flow restraining elements respectively interposed in said second and third fluid flow lines whereby the rate of travel of said second wall means in the direction of travel aided by said external force is controlled by the combined flow characteristics of both said flow restraining elements until said third port is blocked by said second wall means and then is controlled by said first flow restraining element alone, and when the actuator and load reach said one extreme of travel said third port again opens to said working fluid chamber and connects through that chamber to said first flow line for lowering pressure levels in the system.

References Cited in the file of this patent

UNITED STATES PATENTS

| | | |
|---|---|---|
| 640,504 | Thomas | Jan. 2, 1900 |
| 840,877 | Steedman | Jan. 8, 1907 |
| 1,283,179 | Hennebohle | Oct. 29, 1918 |
| 1,905,065 | Scholl | Apr. 25, 1933 |
| 1,942,927 | Johnson et al. | Jan. 9, 1934 |

FOREIGN PATENTS

| | | |
|---|---|---|
| 1,056,143 | France | Oct. 21, 1953 |